(12) United States Patent
Kim et al.

(10) Patent No.: US 12,554,613 B2
(45) Date of Patent: Feb. 17, 2026

(54) EVENT PROCESSING METHOD AND SYSTEM

(71) Applicant: SAMSUNG SDS CO., LTD., Seoul (KR)

(72) Inventors: Se Jin Kim, Seoul (KR); Chang Jae Park, Seoul (KR); Ju Ho Lee, Seoul (KR); Hwa Young Kim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 172 days.

(21) Appl. No.: 18/384,158

(22) Filed: Oct. 26, 2023

(65) Prior Publication Data

US 2024/0143472 A1    May 2, 2024

(30) Foreign Application Priority Data

Oct. 28, 2022 (KR) .................. 10-2022-0141629

(51) Int. Cl.
*G06F 16/00* (2019.01)
*G06F 11/30* (2006.01)

(52) U.S. Cl.
CPC ...... *G06F 11/3072* (2013.01); *G06F 2201/86* (2013.01)

(58) Field of Classification Search
CPC .............................. G06F 16/285; G06F 16/35
See application file for complete search history.

(56) References Cited

U.S. PATENT DOCUMENTS

| | | | |
|---|---|---|---|
| 6,996,551 B2 | 2/2006 | Hellerstein et al. | |
| 9,547,547 B2* | 1/2017 | Heinz | G06F 11/0721 |
| 9,658,903 B2* | 5/2017 | Ye | G06F 9/542 |
| 10,977,256 B2 | 4/2021 | Johnson | |
| 11,829,415 B1* | 11/2023 | Batsakis | G06F 16/953 |
| 11,924,021 B1* | 3/2024 | Goyal | H04L 41/0631 |
| 12,321,396 B1* | 6/2025 | Sajja | G06F 16/906 |
| 2008/0109824 A1* | 5/2008 | Chen | G06F 9/542 719/318 |
| 2013/0110745 A1* | 5/2013 | Zhang | G06N 5/025 706/12 |
| 2013/0139179 A1* | 5/2013 | Roll | G06F 11/079 719/318 |

(Continued)

FOREIGN PATENT DOCUMENTS

| | | |
|---|---|---|
| CN | 111045847 A | 4/2020 |
| CN | 108964995 B | 9/2021 |

(Continued)

OTHER PUBLICATIONS

Communication issued Mar. 7, 2024 by the European Patent Office in European Patent Application No. 23205963.4.

*Primary Examiner* — Noosha Arjomandi
(74) *Attorney, Agent, or Firm* — Sughrue Mion, PLLC

(57) ABSTRACT

An event processing method performed by at least one computing device is provided. The method may include collecting a plurality of events; grouping at least some of the collected plurality of events based on code values respectively associated with the collected plurality of events, wherein the code values indicate at least one of originating service devices in which the plurality of events have occurred or services provided by the originating service devices; and regenerating the grouped events into a single event.

19 Claims, 17 Drawing Sheets

(56) References Cited

U.S. PATENT DOCUMENTS

| | | | |
|---|---|---|---|
| 2019/0089576 A1* | 3/2019 | Willhoit | G06F 11/3003 |
| 2020/0034467 A1* | 1/2020 | Kolchinsky | G06F 16/24568 |
| 2020/0201856 A1 | 6/2020 | Israel et al. | |
| 2020/0258181 A1* | 8/2020 | Song | G06Q 10/10 |
| 2021/0133015 A1* | 5/2021 | Agarwal | G06F 16/2455 |
| 2021/0144026 A1* | 5/2021 | Stein | H04L 12/40052 |
| 2021/0367830 A1* | 11/2021 | Jain | H04L 41/0645 |
| 2022/0147406 A1* | 5/2022 | Laurenzio | G06F 16/285 |
| 2022/0159467 A1 | 5/2022 | Koral | |
| 2023/0247048 A1* | 8/2023 | Samosseiko | H04L 63/1416 726/23 |
| 2024/0378371 A1* | 11/2024 | Ullal | G06F 16/9535 |

FOREIGN PATENT DOCUMENTS

| | | |
|---|---|---|
| CN | 110912753 B | 3/2022 |
| KR | 10-1257236 B1 | 4/2013 |
| KR | 10-2016-0059606 A | 5/2016 |
| WO | 2020/206403 A1 | 10/2020 |
| WO | 2021/120010 A1 | 6/2021 |

\* cited by examiner

40

| DEVICE GROUPS (41) | SERVICE DEVICES (42) | EVENT GRADES (43) | SERVICE SCOPE CODE VALUES (44) | ELIGIBILITY FOR AUTOMATIC ACTIONS (45) | ELIGIBILITY FOR AUTOMATIC CLOSURE (46) |
|---|---|---|---|---|---|
| HWT1 | HWD1 | WARNING | MAIL | Y | Y |
| | HWD2 | WARNING | MAIL | Y | Y |
| | HWD3 | WARNING | MAIL | Y | Y |
| | HWD4 | WARNING | MAIL | Y | Y |
| HWT2 | HWD5 | CRITICAL | ALL | Y | Y |
| | HWD6 | CRITICAL | ALL | Y | Y |
| FILTERING INFORMATION (47) | | NORMAL | WARNING | CRITICAL | FATAL |
| HWD1 | EVENT OCCURRENCE COUNT FOR GRADE ELEVATION (48) | 5 | 4 | 3 | - |
| HWD2 | | | | | |
| HWD3 | | | | | |
| HWD4 | | | | | |

FIG. 3

EVENT PROCESSING METHOD AND SYSTEM

CROSS-REFERENCE TO RELATED APPLICATION

This application claims priority from Korean Patent Application No. 10-2022-0141629 filed on Oct. 28, 2022 in the Korean Intellectual Property Office, and all the benefits accruing therefrom under 35 U.S.C. 119, the contents of which in its entirety are herein incorporated by reference.

BACKGROUND

1. Field

The present disclosure relates to an event processing method and system.

2 Description of the Related Art

In monitoring targets such as devices, equipment, and systems, various events may occur. These events are typically notified to administrators, who then take appropriate actions based on the events.

However, indiscriminately notifying administrators of a large number of events may burden the administrators and hinder efficient handling of events. Moreover, administrators might overlook genuinely important events.

SUMMARY

Aspects of the present disclosure provide a method and system for handling a large number of events when they occur.

Aspects of the present disclosure also provide a method and system for simplifying multiple events to reduce the frequency of notifications to an administrator.

Aspects of the present disclosure also provide a method and system for providing an efficient processing process for unnecessary events that do not need notification to or action by an administrator.

Aspects of the present disclosure also provide a method and system for accurately supplementing incomplete events into a form that may be processed/notified.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided an event processing method performed by at least one processor. The method may comprise collecting a plurality of events; grouping at least some of the collected plurality of events based on code values respectively associated with the collected plurality of events, wherein the code values indicate at least one of originating service devices in which the plurality of events have occurred or services provided by the originating service devices; and regenerating the grouped events into a single event.

In some embodiments, the grouping may comprise identifying device groups where the collected plurality of events have occurred based on the code values and grouping events originating from a same device group based on a result of the identifying.

In some embodiments, the grouped events may be events originating from a first device group, and the regenerating may comprise acquiring a predefined first rule for the first device group, which is a rule that, based on a number of events with a particular grade, among the grouped events, exceeding a threshold value, upgrades the events with the particular grade; and regenerating the grouped events into an event with a higher grade than the particular grade based on a determination that the number of events with the particular grade, among the grouped events, exceeds the threshold value.

In some embodiments, the grouping may comprise acquiring predefined filtering information, which includes at least one code value associated with each target event to be filtered; removing at least one of the collected plurality of events by comparing each of the code values of the collected plurality of events and the at least one code value of the filtering information; and grouping at least some of remaining events of the collected plurality of events.

In some embodiments, the method may further comprise receiving an additional event, identifying a scope of a service associated with the additional event based on a code value associated with the additional event, wherein the scope of the service indicates a range of a service provided by an originating service device where the additional event has occurred and generating multiple events from the additional event based on the identified scope of the service.

In some embodiments, the method may further comprise receiving an incomplete event; determining similarities between a code value associated with the incomplete event and code values of predefined events; and supplementing the incomplete event using event information for events having higher similarities than a similarity threshold.

In some embodiments, the method may further comprise determining whether the regenerated event qualifies for an automatic action, acquiring a predefined second rule for the regenerated event, which is a rule that defines the automatic action, based on a determination that the regenerated event qualifies for the automatic action and performing the automatic action on the regenerated event in accordance with the predefined second rule.

In some embodiments, the method may further comprise after the performing, determining whether the regenerated event qualifies for an automatic closure and pausing a notification to an administrator and terminating a processing process for the regenerated event based on a determination that the regenerated event qualifies for the automatic closure.

In some embodiments, the method may further comprise collecting an additional event and regrouping the additional event and the regenerated event based on code values respectively associated with the regenerated event and the additional event.

In some embodiments, the grouping may comprise acquiring a trained machine learning model from data regarding a plurality of events for training, and determining whether the collected plurality of events are grouped, using the trained machine learning model, and the data may include code values respectively associated with of the plurality of events for training and event type information and grouping status information for each of the plurality of events for training.

According to another aspect of the present disclosure, there is provided an event processing system. The system may comprise at least one processor and a memory configured to store one or more instructions, wherein by executing the one or more instructions stored in the memory, the at least one processor is configured to perform: collecting a plurality of events; grouping at least some of the collected plurality of events based on code values respectively associated with of the collected plurality of events, wherein the code values indicate at least one of originating service devices where the events have occurred or services provided by the originating service devices; and regenerating the grouped events into a single event.

In some embodiments, the grouping may comprise identifying device groups where the collected plurality of events have occurred based on the code values and grouping events originating from a same device group based on a result of the identifying.

In some embodiments, the grouped events are events originating from a first device group, and the regenerating comprises acquiring a predefined first rule for the first device group, which is a rule that, based on a number of events with a particular grade, among the grouped events, exceeding a threshold value, upgrades the events with the particular grade; and regenerating the grouped events into an event with a higher grade than the particular grade based on a determination that the number of events with the particular grade, among the grouped events, exceeds the threshold value.

In some embodiments, the grouping may comprise acquiring predefined filtering information, which includes at least one code value associated with each target event to be filtered; removing at least one of the collected plurality of events by comparing the code values of the collected plurality of events and the at least one code value of the filtering information; and grouping at least some of remaining events of the collected plurality of events.

In some embodiments, the at least one processor may further perform operations of: receiving an additional event; identifying a scope of a service associated with the additional event based on a code value associated with the additional event, wherein the scope of the service indicates a range of a service provided by an originating service device where the additional event has occurred; and generating multiple events from the additional event based on the identified scope of the service.

In some embodiments, the at least one processor may further perform operations of: receiving an incomplete event; determining similarities between a code value associated with the incomplete event and code values of predefined events; and supplementing the incomplete event using event information for events having higher similarities than a similarity threshold.

In some embodiments, the at least one processor may further perform operations of: determining whether the regenerated event qualifies for an automatic action; acquiring a predefined second rule for the regenerated event, which is a rule that defines the automatic actions, based on a determination that the regenerated event qualifies for the automatic action; and performing the automatic actions on the regenerated event in accordance with the predefined second rule.

In some embodiments, the at least one processor may further perform operations of: collecting an additional event; and regrouping the additional event and the regenerated event based on code values respectively associated with of the additional event and the regenerated event.

In some embodiments, the grouping may comprise acquiring a trained machine learning model from data regarding a plurality of events for training, and determining whether the collected plurality of events are grouped, using the trained machine learning model, and the data may include code values respectively associated with of the plurality of events for training and event type information and grouping status information for each of the plurality of events for training.

According to still another aspect of the present disclosure, there is provided a non-transitory computer-readable recording medium storing computer program executable by at least one processor to perform: collecting a plurality of events; grouping at least some of the collected plurality of events based on code values respectively associated with of the collected plurality of events, wherein the code values indicate at least one of originating service devices where the events have occurred or services provided by the originating service devices; and regenerating the grouped events into a single event.

According to the aforementioned and other embodiments of the present disclosure, an overall event processing process may be simplified, and event information notified to the administrator in connection with the event processing process may be streamlined by merging multiple events. Additionally, the processing cost of a system for event handling may be reduced.

Also, before grouping multiple events, filtering may be performed on some of the events. Consequently, the processing cost allocated to handling less critical events may be preemptively reduced.

Also, events that are eligible for automatic actions may be swiftly processed according to predefined procedures. Accordingly, the workload of the administrator may be reduced.

Also, a processing process for events with an automatic closure value preset therefor may be terminated without further steps, such as notifications to the administrator. Consequently, the workload of the administrator may be further alleviated.

Also, if new additional events occur during the processing process for multiple events, grouping may be performed, incorporating the additional events. Therefore, the number of events notified to the administrator may be further reduced.

Also, automatic supplementation may be performed for incomplete events. As a result, more comprehensive event information may be notified to the administrator, significantly mitigating the issue of missing critical events.

Also, events may be selectively added or removed as needed, rather than merely reducing the number of occurring events. Accordingly, it is possible to enable the administrator to have a clearer understanding of the events they are notified about.

Also, event grouping may be performed using machine learning models. Therefore, the accuracy of an event processing process may be further enhanced.

Lastly, events may be selectively notified to the administrator based on priorities. This may prevent indiscriminate event notifications to the administrator and improve the efficiency of the operational process compared to the traditional approach of notifying the administrator whenever each event occurs.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which:

FIG. 3 presents a reference table according to some embodiments of the present disclosure;

DETAILED DESCRIPTION

Figure 1:
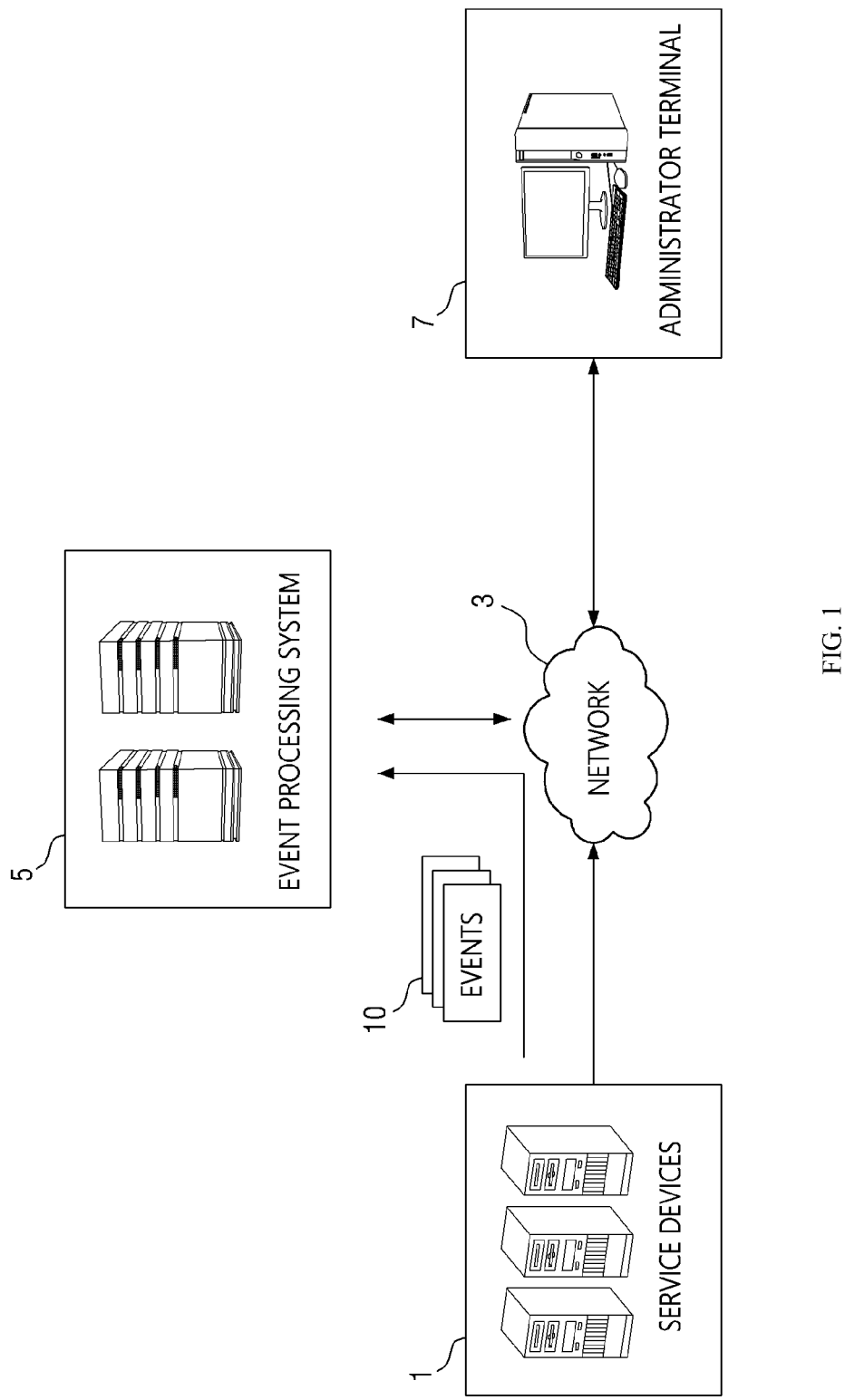
FIG. 1 is a schematic view illustrating an operational environment for an event processing system according to an embodiment of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

FIG. 1 is a schematic view illustrating an operational environment for an event processing system according to an embodiment of the present disclosure.

Referring to FIG. 1, an event processing system 5 may collect a plurality of events 10 originating from various service devices 1. For example, the event processing system 5 may collect events associated with the abnormal state of any one of the various service devices 1.

Specifically, the event processing system 5 may collect events 10 to monitor the state of the service devices 1 and associated services and may perform appropriate actions based on the collected events 10. Additionally, the event processing system 5 may store event information in a designated storage.

The event processing system 5 may perform various processes for the events 10, such as grouping, filtering, automatic actions, event subdivision, and information supplementation.

For example, the event processing system 5 may regenerate the events 10 as a single event by grouping the events 10 with reference to code values associated with the events 10. As a result, the number of events (or target events for processing) notified to an administrator may decrease, and the efficiency of an event processing process may improve.

Here, the code values associated with the evens 10 may correspond to values (e.g., identifiers, names, etc.) indicating the originating service devices 1 (or services) where the events 10 have occurred, but the present disclosure is not limited thereto.

Additionally, the event processing system 5 may elevate the grade of the regenerated event by referencing a first rule. For example, the first rule may be a rule that elevates the grade of the regenerated grade if the number of events 10 belonging to a specific grade exceeds a threshold value, but the present disclosure is not limited thereto. This example will be described later with reference to FIGS. 7 and 8.

The grade of events (e.g., "FATAL," "CRITICAL," "WARNING," or "NORMAL") may be determined based on their severity (or importance) of and will be described later with reference to FIG. 3.

Moreover, for example, the event processing system 5 may take automatic actions on events by referencing a second rule. The second rule may be a rule that defines how to handle specific events. Therefore, the event processing system 5 may take automatic actions (e.g., resetting malfunctioning devices) for events for which an automatic action value is set according to the second rule, without requiring the administrator's intervention. This example will be described later with reference to FIG. 9.

Furthermore, for example, the event processing system 5 may filter at least some events using predefined filtering information or subdivide one event into multiple events by referencing service scope code values. This example will be described later with reference to FIGS. 5, 6, and 11.

Figure 17:
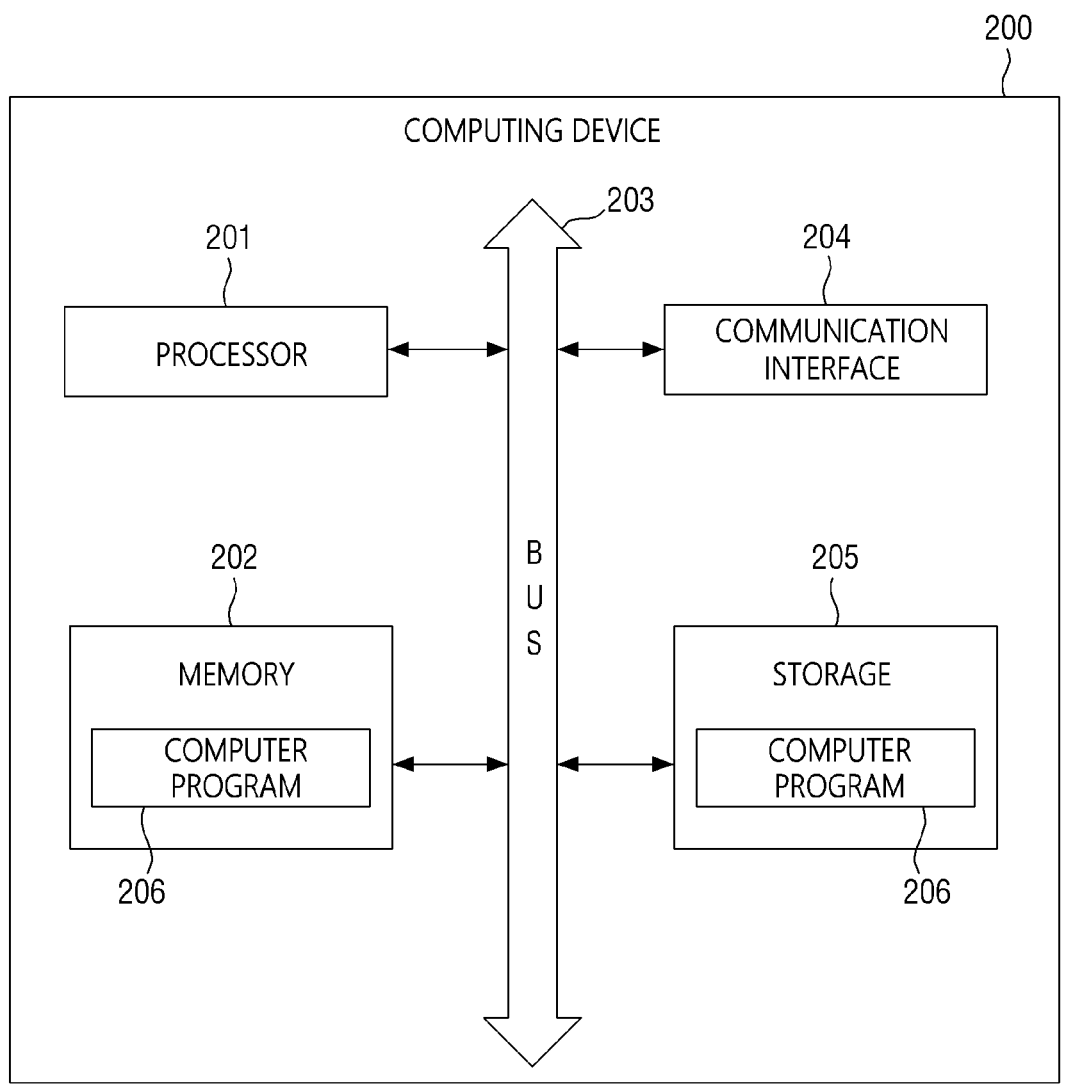
FIG. 17 is a hardware configuration view of an exemplary computing system that may implement the event processing system according to some embodiments of the present disclosure.

The event processing system 5 may be implemented by at least one computing device. Here, the term "computing device" may encompass any device equipped with computing capabilities, and an example of such device is as illustrated in FIG. 17.

A computing device may contain various components (e.g., a memory, a processor, etc.), and may thus be referred to as a "computing system." Also, a computing system may signify a group of multiple computing devices interacting with each other.

The service devices 1 may refer to target devices and/or systems to be monitored. FIG. 1 illustrates devices (e.g., server devices) providing a particular service (e.g., emailing service) as monitoring targets, but the monitoring targets may vary. Alternatively, processes (e.g., semiconductor manufacturing processes) or process equipment (e.g., semiconductor manufacturing equipment) may also be the monitoring targets.

An administrator terminal 7 may be a terminal on the administrator's side that receives notifications of events. The administrator terminal 7 may be implemented as any suitable device. The administrator may use the administrator terminal 7 to identify notified events and take appropriate actions, as well as to perform administrative tasks such as defining new events or rules.

Up to this point, the event processing system 5 and its operational environment have been described with reference to FIG. 1. Methods (or operations) that may be performed in the event processing system 5 will hereinafter be described with reference to FIG. 2 and the subsequent figures.

For clarity and convenience, it is assumed that all stages/operations of the methods that will hereinafter be described are performed within the event processing system 5 in the operational environment depicted in FIG. 1. Consequently, if the subject of a specific stage/operation is not explicitly mentioned, it may be understood that the specific stage/operation is performed within the event processing system 5. However, in real-world scenarios, some stages/operations of the methods that will hereinafter be described may be executed on different computing devices, and the operational environment of the event processing system 5 may be configured differently from that depicted in FIG. 1.

Figure 2:
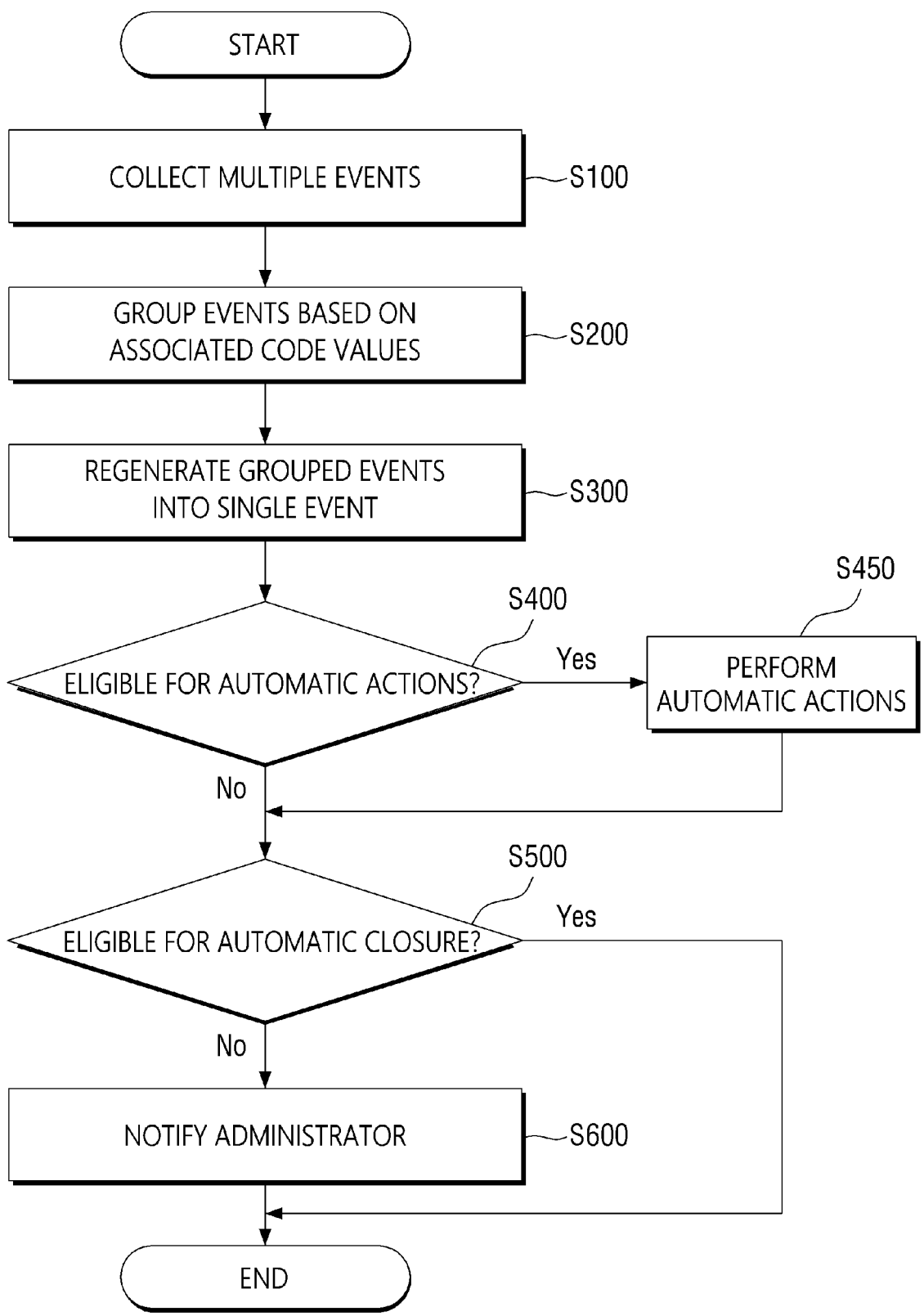
FIG. 2 is a flowchart illustrating an event processing method according to an embodiment of the present disclosure.

FIG. 2 is a flowchart illustrating an event processing method according to some embodiments of the present disclosure. However, the event processing method of FIG. 2 is merely exemplary, and it should be noted that some steps may be added or removed as needed.

Referring to FIG. 2, the event processing method may commence with S100, which involves collecting a plurality of events originating from various service devices.

The collected events may include, for example, events indicating anomalies in service devices (e.g., errors due to memory issues, connection errors due to network problems, etc.), but the present disclosure is not limited thereto.

The collection of events by the event processing system 5 may involve receiving event information regarding the events. The event information may include, for example, identifiers, names, types, occurrence times (e.g., timestamps), originating service devices (e.g., device identifiers (or code values), IP addresses, etc.), grades, and descriptions (e.g., event descriptions, causes of occurrence, etc.), but the present disclosure is not limited thereto.

In S200, the event processing system 5 may group the collected events by referencing code values associated with the collected events.

For example, the event processing system 5 may identify a device group (or service) for each of the collected events by querying a predefined reference table (from FIG. 3) based on device code values from the event information. Furthermore, the event processing system 5 may group events originating from the same device group (or service) into a single group. In some embodiments, the event processing system 5 may further consider event types in grouping events. For example, the event processing system 5 may group events with the same event type that originate from the same device group (or service) into a single group.

In S300, the event processing system 5 may regenerate a single event by combining the grouped events. In some embodiments, the regenerated event may be referred to as a "composite event," while events that remain ungrouped may be referred to as "individual events."

In S400, the event processing system 5 may determine whether the regenerated event qualifies for automatic actions. For example, the event processing system 5 may determine whether the regenerated event is subject to automatic actions based on a predetermined automatic action-related value for the regenerated event (or for the originating service device or service associated with the regenerated event). The predetermined automatic action-related value may be set in advance by, for example, the administrator.

Furthermore, the event processing system 5 may also determine whether ungrouped individual events qualify for automatic actions.

In S450, the event processing system 5 may execute automatic actions on events that are determined as eligible for automatic actions, without requiring the administrator's intervention, in accordance with a predefined rule. S400 and S450 will be described later in further detail with reference to FIG. 9.

In S500, the event processing system 5 may determine whether the regenerated event qualifies for automatic closure. The event processing system 5 may also determine whether the individual events qualify for automatic closure. The eligibility for automatic closure may be determined in a similar manner to the eligibility for automatic actions, as in S400.

For example, the event processing system 5 may determine whether a specific event qualifies for automatic closure by querying the predefined reference table (from FIG. 3) based on the device code values from the event information. If the specific event is determined as eligible for automatic closure, the event processing system 5 may pause notifications to the administrator and terminate the processing process for the specific event. As a result, unnecessary notifications of events (i.e., less critical events) that do not require the administrator's attention or intervention may be prevented in advance.

In S600, the event processing system 5 may notify the administrator on the regenerated event (or the individual events). For example, the event processing system 5 may prioritize event notifications based on event grades and types and may notify the administrator accordingly. Specifically, the event processing system 5 may give priorities to higher-grade events or predefined types of events (e.g., events not eligible for automatic actions, events originating from critical service devices, events with longer response times, etc.) when notifying the administrator. In this manner, timely actions may be taken by the administrator for critical events.

So far, the event processing method according to some embodiments of the present disclosure has been described with reference to FIG. 2. As mentioned earlier, multiple events collected from various service devices may be reconstituted into a single event by referencing their associated code values. As a result, the number of events notified to the administrator may be reduced significantly, greatly easing the administrator's workload. Additionally, the efficiency of an event processing process may be enhanced.

Various examples of the event processing method according to some embodiments of the present disclosure will hereinafter be described with reference to FIGS. 3 through 14.

FIG. 3 presents a reference table 40 according to some embodiments of the present disclosure. Specifically, FIG. 3 depicts a reference table 40 that includes filtering information 47 and an event grade elevation rule 48.

As previously mentioned, the event processing system 5 may perform event grouping and regeneration by referencing a predefined reference table based on the device code values of received events. The reference table 40 may be defined in advance by, for example, the administrator.

The processing of events will hereinafter be described with reference to FIGS. 4 through 14, assuming that a reference table such as the reference table 40 of FIG. 3 is defined in advance.

Figure 4:
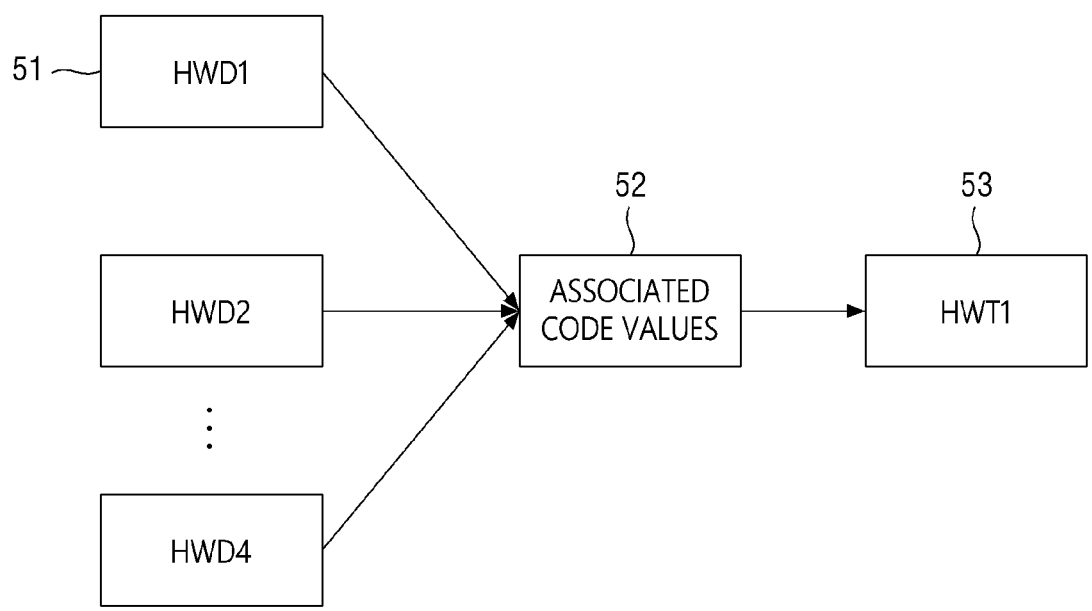
FIG. 4 is a schematic view illustrating the regeneration of a single event from multiple events originating from the same device group according to some embodiments of the present disclosure.

FIG. 4 is a schematic view illustrating the regeneration of a single event from multiple events originating from the same device group according to some embodiments of the present disclosure.

In some embodiments, the event processing system 5 may identify a device group that service devices where events have occurred belong to by referencing device code values associated with the events.

Specifically, referring to FIGS. 3 and 4, the event processing system 5 may identify service devices 42 where multiple events have occurred and their respective device groups 41 by referencing the reference table 40 of FIG. 3.

For example, the event processing system 5 may query the reference table 40 for the code values for device groups 41 (e.g., HWT1 and HWT2) associated with the multiple events, using device code values (e.g., HWD1 through HWD6) of the multiple events. Subsequently, the event processing system 5 may compare the code values of the device groups 41 associated with the multiple events to confirm that the multiple events have occurred in two service device groups 41. In this case, as illustrated in FIG. 4, the event processing system 5 may group events 51 belonging to the same device group into a single group and regenerate a single event 53 from the grouped events 51.

Meanwhile, in some embodiments, the event processing system 5 may perform filtering on collected events using the filtering information 47, which is set in advance. For example, the event processing system 5 may filter some events before or after the grouping of the events. This filtering may reduce the number of events processed by the event processing system 5 in advance. The filtering information 47 may be set in advance by the administrator.

An event filtering method will hereinafter be described with reference to FIGS. 5 and 6.

Figure 5:
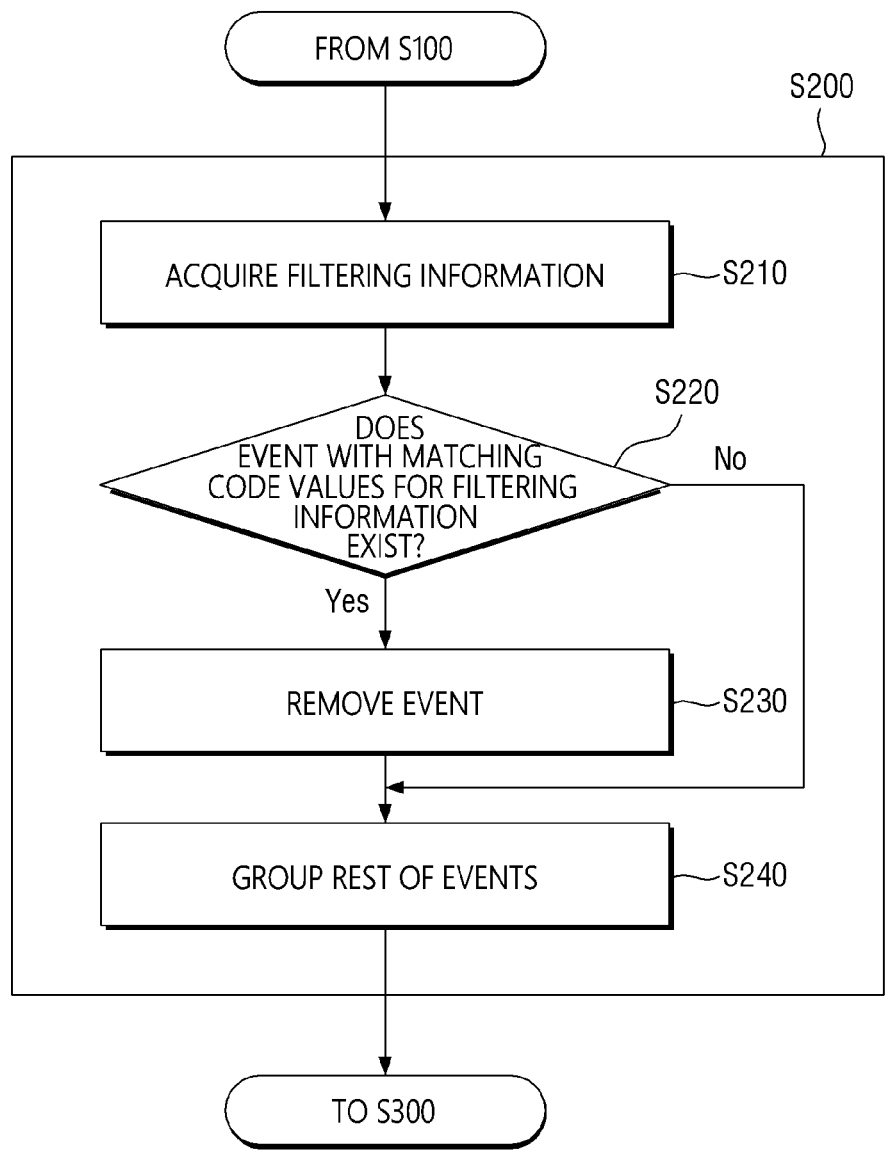
FIG. 5 is a flowchart illustrating S200 of FIG. 2.
Figure 6:
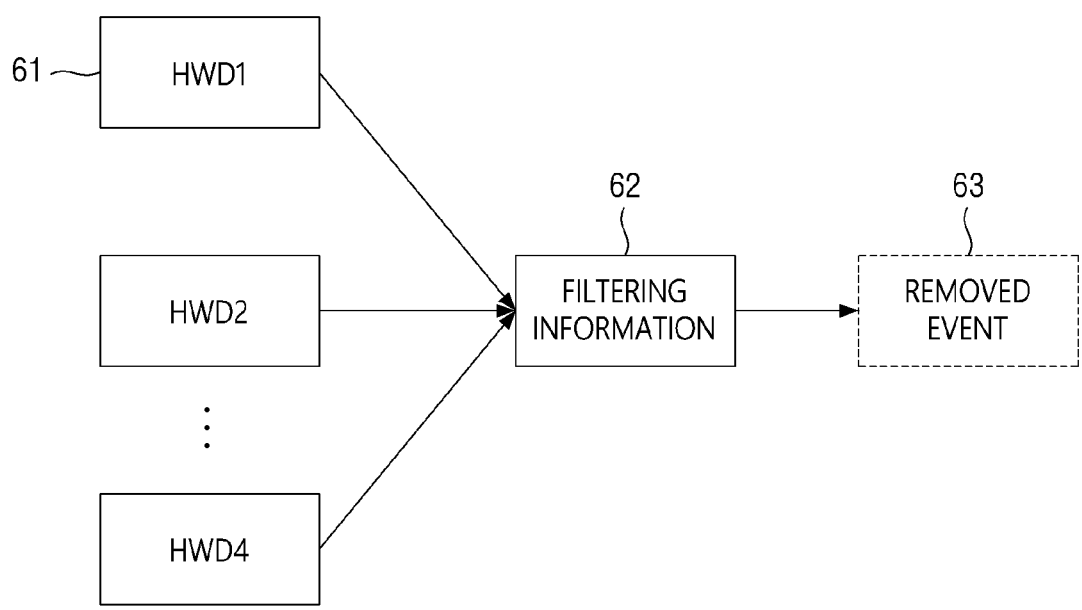
FIG. 6 is a schematic view illustrating the removal of an event using filtering information according to some embodiments of the present disclosure.

FIG. 5 is a flowchart illustrating an event filtering method according to some embodiments of the present disclosure.

Referring to FIG. 5, the event processing system 5 may acquire predefined filtering information (S210). The filtering information may have been set in advance by, for example, the administrator.

The filtering information may be defined in various manners. For example, the filtering information may be defined based on factors such as code values of service devices, code values of device groups, code values of services, event types, and event grades, but the present disclosure is not limited thereto. Specifically, to filter events originating from particular service devices, the code values of the particular service devices may be defined in the filtering information. Alternatively, to filter events of particular types, the particular types may be defined in the filtering information. Alternatively, to filter events of particular grades, the particular grades may be defined in the filtering information. For convenience, it is assumed that the code values of particular service devices are defined in the filtering information.

Thereafter, the event processing system 5 may compare the code values included in the filtering information with the code values (e.g., device code values) associated with the collected events (S220).

Thereafter, the event processing system 5 may remove events with matching code values for the filtering information from the collected events (S230) and then perform grouping on the rest of the collected events (S240).

If there are no events to be filtered, event grouping may be performed on all the collected events.

The event filtering method according to some embodiments of the present disclosure will be described in further detail with reference to FIG. 6. Referring to FIG. 6, it is assumed that code values HWD1 through HWD4 for service devices are defined in filtering information 62.

The event processing system 5 may compare the filtering information 62 with device code values of the collected events, i.e., events 61.

If the device code values for the events 61 match the code values defined in the filtering information 62, the event processing system 5 may determine the events 61 as filtering targets and then remove the events 61. Then, the event processing system 10 may perform event grouping on the remaining events (e.g., events occurring in service devices with code values HWD5 and HWD6).

Meanwhile, in some embodiments, the event processing system 5 may handle the collected events while considering their grades. As described above with reference to FIG. 1, the event processing system 5 may group multiple events based on their grades or elevate the grades in accordance with a first rule with the importance and urgency of the multiple events reflected thereinto.

For example, as illustrated in FIG. 3, a reference count 48 for event grade elevation may be set in advance. In other words, a first rule that elevates the grade of grouped events when the event occurrence count exceeds the reference count 48 may be set in advance. In this case, if the number of events with the particular grade, among the grouped events, exceeds the reference count 48, the event processing system 5 may raise the grade of the grouped events by one level.

For example, if there are 5 or more events with a "NORMAL" grade within the grouped events, the event processing system 5 may upgrade the corresponding events (i.e., the grouped events) to a "WARNING" grade. Similarly, if there are four or more events with the "WARNING" Grade or three or more events with a "CRITICAL" grade among the grouped events, the event processing system 5 may elevate the grade of the corresponding events by one level.

However, for events with a "FATAL" grade, the event processing system 5 may not set the reference count 48 for event grade elevation because these events are already regarded as the most critical. However, the present disclosure is not limited to this.

An event grade elevation method according to some embodiments of the present disclosure will hereinafter be described with reference to FIGS. 7 and 8.

Figure 7:
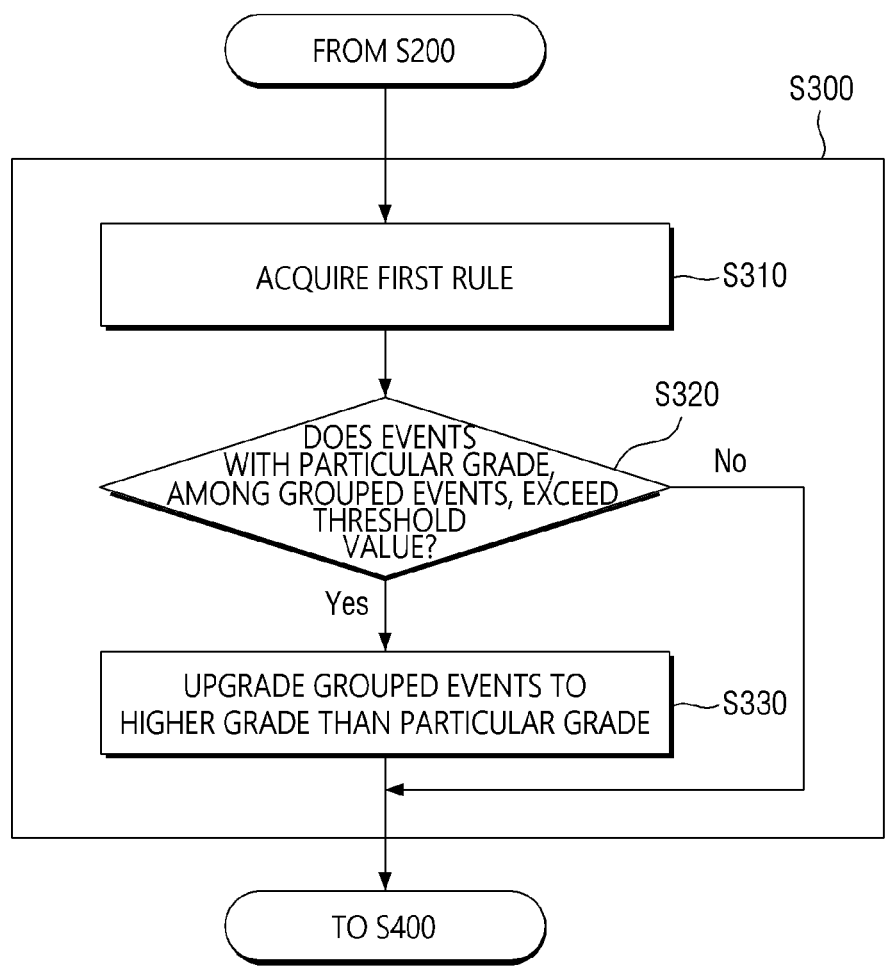
FIG. 7 is a flowchart illustrating S300 of FIG. 2.

FIG. 7 is a flowchart illustrating S300 of FIG. 2.

Referring to FIG. 7, the event processing system 5 may acquire a predefined first rule S310. As mentioned earlier, the first rule may be a rule that defines a reference count for event grade elevation for a particular grade.

Thereafter, the event processing system 5 may determine whether the number of events with the particular grade, among the grouped events, exceeds the reference count defined in the first rule (S320).

If the number of the events with the particular grade exceeds the reference count, the event processing system 5 may upgrade the grouped events to a grade one level higher than the particular grade (S330).

Thus, the event grade elevation method according to some embodiments of the present disclosure may be understood as providing additional steps to be performed during the regeneration of the grouped events.

The event grade elevation method according to some embodiments of the present disclosure will hereinafter be described in further detail with reference to FIG. 8. FIG. 8 illustrates the process of regenerating events 71 with the "WARNING" grade (e.g., 71) into events 74 with the "CRITICAL" grade.

Figure 8:
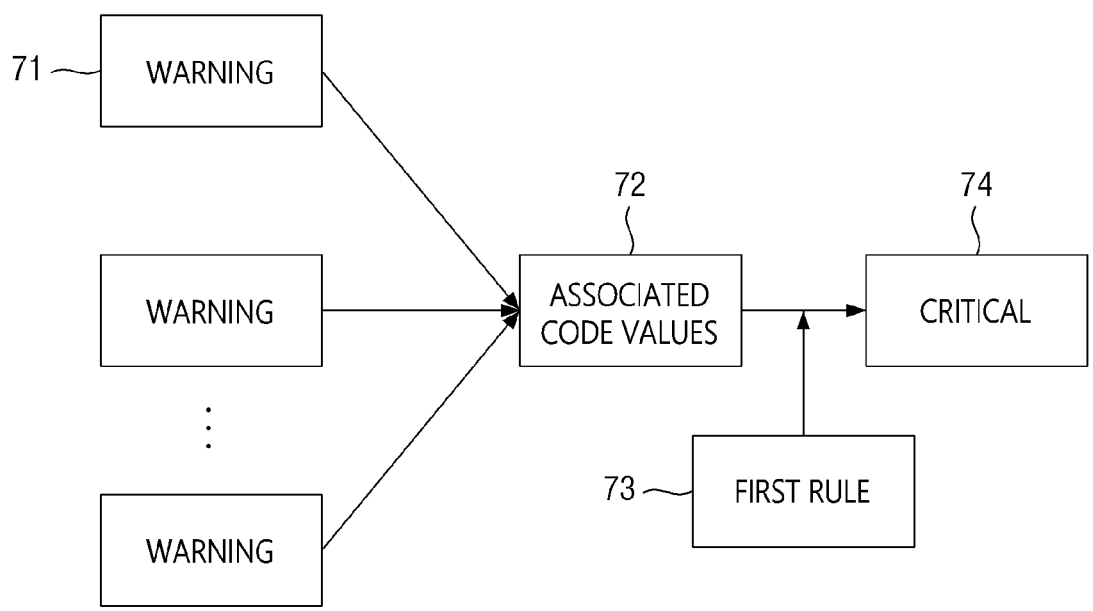
FIG. 8 is a schematic view illustrating the regeneration of an event by elevating the grade of the event according to some embodiments of the present disclosure.

Referring to FIG. 8, it is assumed that the event processing system 5 has grouped events 71 with the "WARNING" grade. In this case, the event processing system 5 may determine whether the number of the events 71 meets the reference count (e.g., 4 in the example of 3) defined in a first rule 73.

If the number of the events 71 exceeds the reference count defined in the first rule 73, the event processing system 5 may upgrade the events 71 to the "CRITICAL" grade, one level higher than the "WARNING" grade, and thereby generates a single event 74.

In short, since the events 61 with the "WARNING" grade meet the first rule and have occurred within the same device group (e.g., HWT1), the event processing system 5 may regenerate the events 61 into a single event 74 with the "CRITICAL" grade.

Meanwhile, in some embodiments, the event processing system 5 may perform event processing by referencing a second rule that defines how to handle particular events. This will hereinafter be described with reference to FIG. 9.

Figure 9:
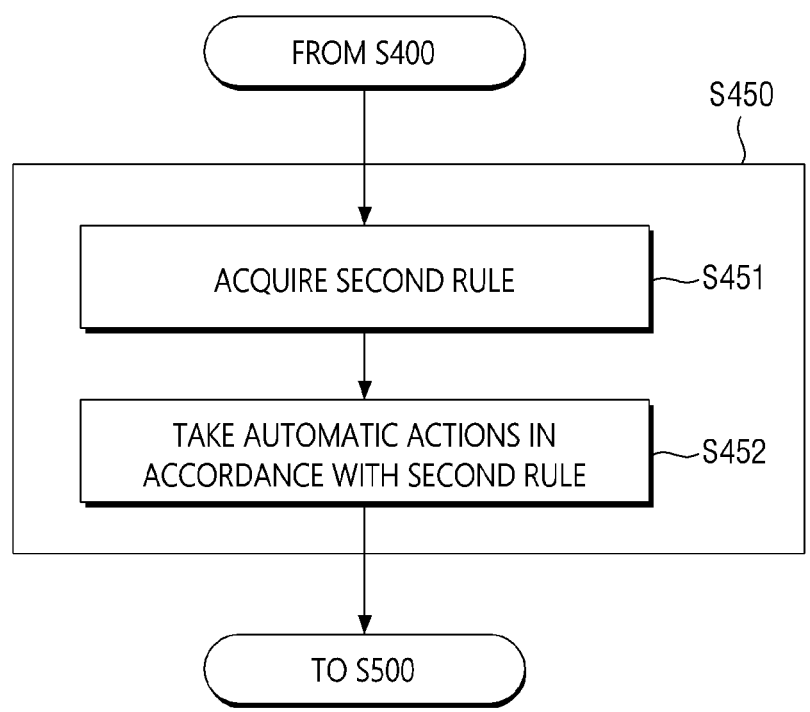
FIG. 9 is a flowchart illustrating S450 of FIG. 2.

FIG. 9 is a flowchart illustrating S450 of FIG. 2.

Referring to FIG. 9, the event processing system 5 may identify a configuration value related to an automatic action status 45 of a particular event by querying the reference table 40 of FIG. 3. Thereafter, the event processing system 5 may determine whether the particular event qualifies for automatic actions. If the particular event is determined as eligible for automatic actions, the event processing system 5 may obtain a predefined second rule that defines the automatic actions (S451). The second rule may be defined and set (or registered) in advance by, for example, the administrator.

The event processing system 5 may determine the eligibility for automatic actions not only for ungrouped individual events, but also for regenerated events.

Thereafter, the event processing system 5 may take automatic actions for the particular event in accordance with the second rule (S452).

The operation of the event processing system 5 when additional events occur will hereinafter be described with reference to FIG. 10.

Figure 10:
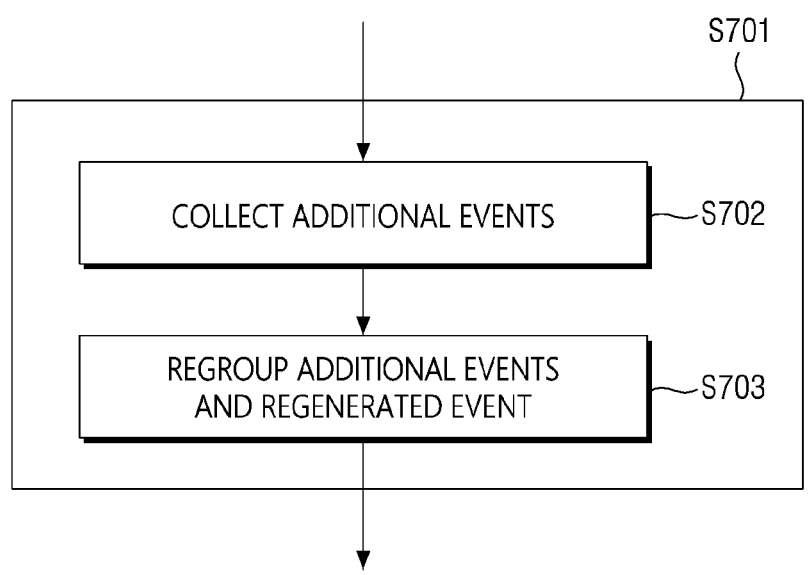
FIG. 10 is a flowchart illustrating the regrouping of events upon the occurrence of additional events according to some embodiments of the present disclosure.

FIG. 10 is a flowchart illustrating the regrouping of events upon the occurrence of additional events according to some embodiments of the present disclosure.

Referring to FIG. 10, the event processing system 5 may collect newly-occurring additional events (S702) while processing multiple events that are previously collected (e.g., event grouping and regeneration).

In this case, the event processing system 5 may perform event regrouping for both the additional events and the regenerated events (S703). That is, an event grouping process may be repeatedly performed, resulting in a further reduction in the number of events notified to the administer.

Meanwhile, in some embodiments, the event processing system 5 may process multiple events using their associated service information. This will hereinafter be described with reference to FIGS. 11 and 12.

Figure 11:
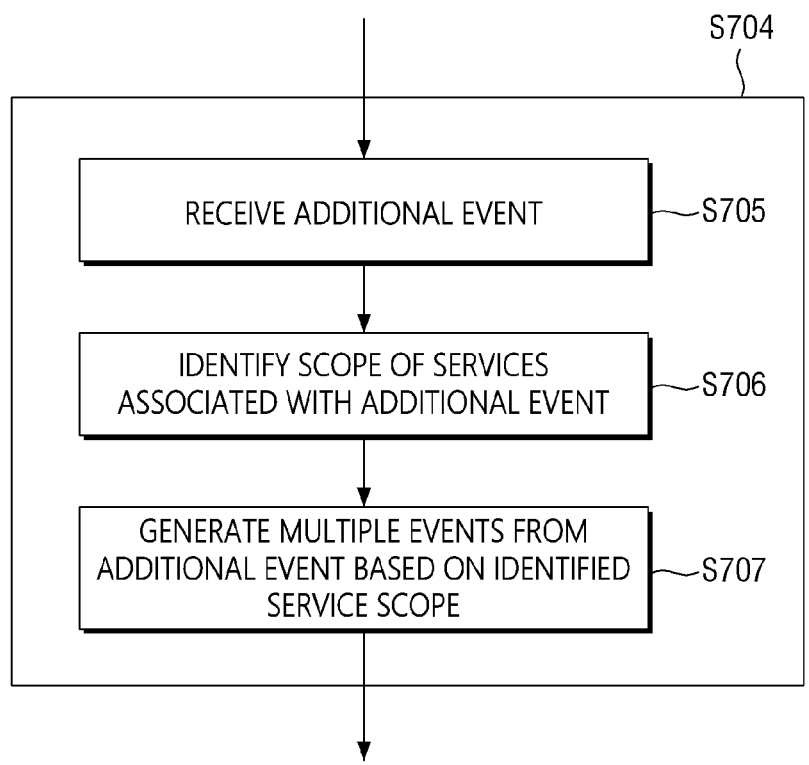
FIGS. 11 and 12 are a flowchart and a schematic view, respectively, illustrating a method of subdividing an additional event into multiple events according to some embodiments of the disclosure.
Figure 12:
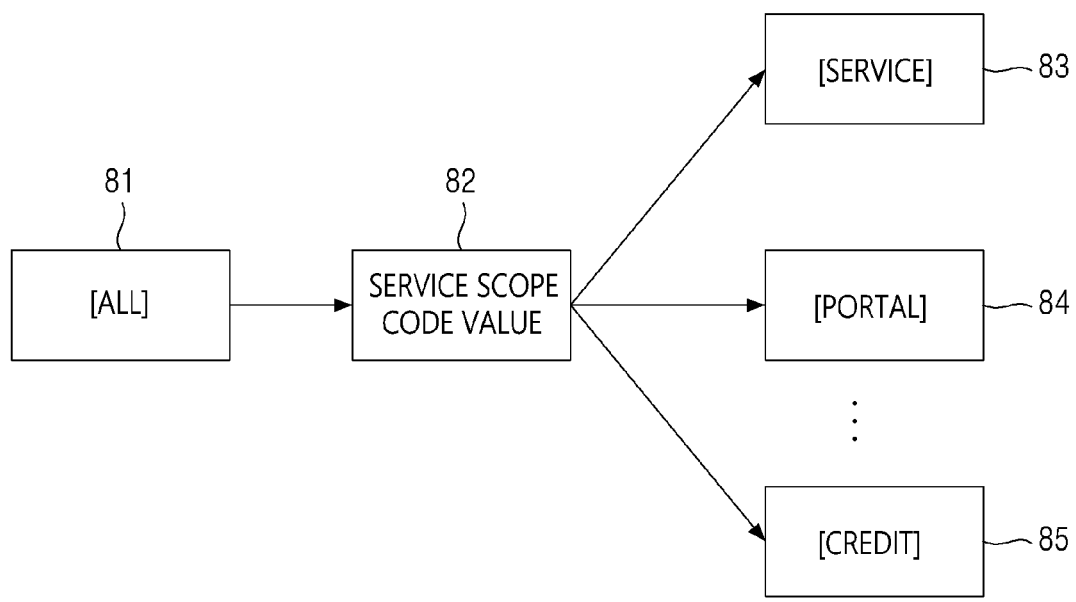

FIGS. 11 and 12 are a flowchart and a schematic view, respectively, illustrating a method of subdividing an additional event into multiple events according to some embodiments of the disclosure. Specifically, FIG. 11 illustrates a method to subdivide an additional event into multiple events, and the method of FIG. 11 may also be directly applicable to existing events that are previously collected.

Referring to FIG. 11, the event processing system 5 may receive an additional event (S705).

Thereafter, the event processing system 5 may identify the scope of services associated with the additional event (S706). For example, the event processing system 5 may examine service information 44 listed in the reference table 40 of FIG. 3 to determine the scope of services associated with the additional event. In other words, the event processing system 5 may identify the types of services associated with the additional event (i.e., services provided by the service device where the additional event has occurred) using the service information 44.

Thereafter, the event processing system 5 may subdivide the additional event by service, thereby generating multiple events (S707).

The method of FIG. 11 will hereinafter be described with reference to FIG. 12. FIG. 12 illustrates a case where an additional event 81 has occurred in a service device (e.g., "HWD5") providing multiple services.

Specifically, referring to FIG. 12, it is assumed that the event processing system 5 has received the additional event 81 originating from the service device HWD5. The event processing system 5 may identify the scope of services associated with the event 81 by referencing the reference table 40 for a service scope code value 82 (e.g., "ALL") for the event 81. Additionally, the event processing system 5 may identify that the scope of services associated with the event 81 includes "[SERVICE]," "[PORTAL]," and "[CREDIT]."

In this case, the event processing system 5 may subdivide the event 81 by service, thereby generating multiple events 83 through 85.

Meanwhile, in some embodiments, the event processing system 5 may supplement an incomplete event using associated information. This will hereinafter be described with reference to FIGS. 13 and 14.

Figure 13:
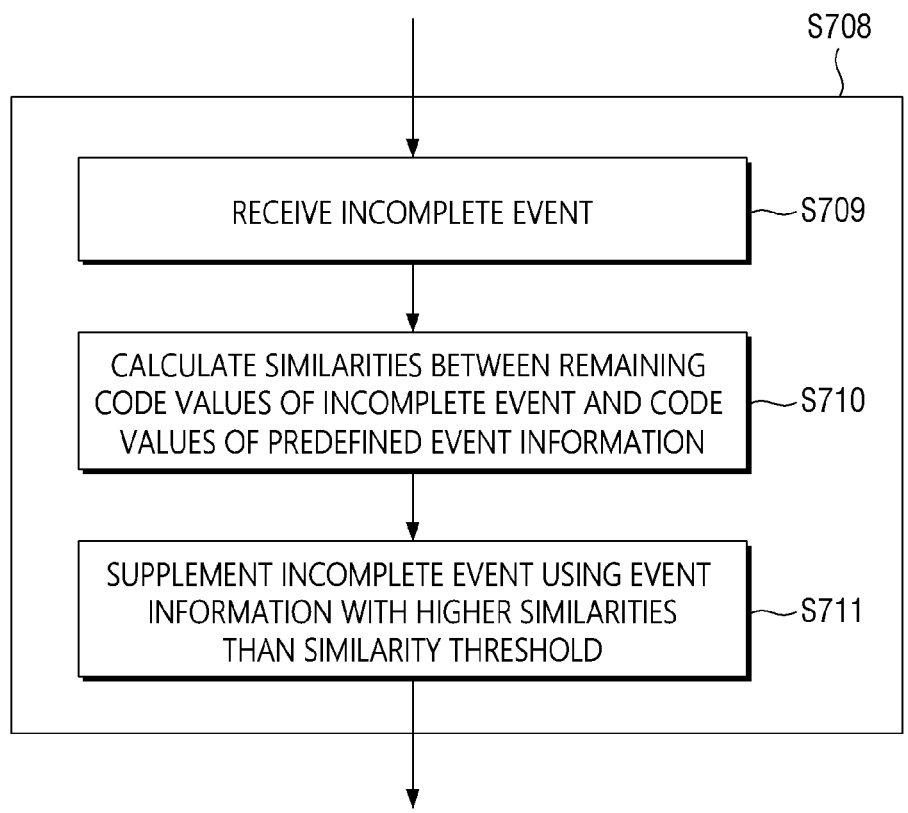
FIGS. 13 and 14 are a flowchart and a schematic view, respectively, illustrating a method of supplementing an incomplete event according to some embodiments of the present disclosure
Figure 14:
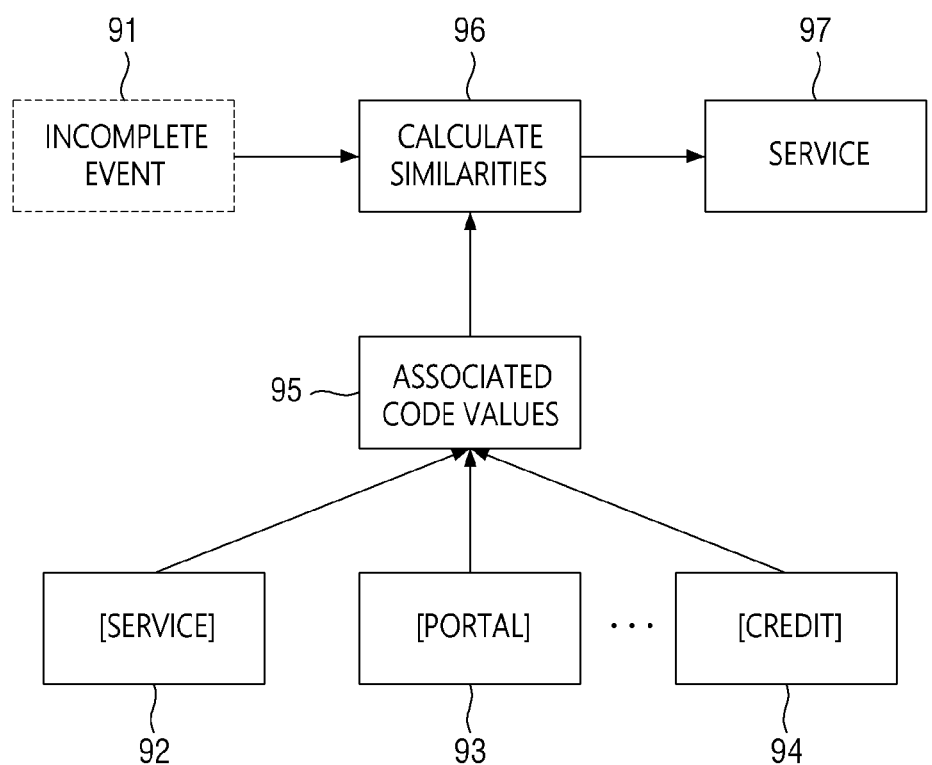

FIGS. 13 and 14 are a flowchart and a schematic view, respectively, illustrating a method of supplementing an incomplete event according to some embodiments of the present disclosure.

Referring to FIG. 13, the event processing system 5 may receive an incomplete event (S709). Here, the incomplete event may refer to an event with missing or incorrect information.

Thereafter, the event processing system 5 may calculate the similarities (e.g., string similarities) between remaining code values of the incomplete event and event information (or code values) for predefined events (S710) and may supplement the incomplete event based on event information for events with higher similarities than a predefined similarity threshold.

The similarity threshold may prevent incorrect information from being included during the supplementation of the incomplete event (i.e., prevent supplementation errors) and may be set in advance by the administrator. The administrator may set the similarity threshold higher to minimize supplementation errors or lower to enhance the function of supplementation. In some embodiments, the administrator may set the similarity threshold for each event grade. For example, the administrator may set the similarity threshold higher for higher-grade events and lower for lower-grade events.

Here, the event information for the existing events may include event types, strings, originating service devices (e.g., device identifiers (or code values), IP addresses, etc.), event grades, and descriptions (e.g., event descriptions, explanations of causes, etc.), but the present disclosure is not limited thereto.

Thereafter, the event processing system 5 may identify an existing event with higher similarities than the similarity threshold and may supplement the incomplete event using information associated with the identified existing event (S711). For example, if there is error in the device code value of the incomplete event, the event processing system 5 may supplement the device code value of the incomplete event based on the device code value of an existing event with a highest string similarity. Alternatively, the event processing system 5 may supplement the device code value of the incomplete event based on the device code value of an existing event having the same event type as the incomplete event and having a similar occurrence time to the incomplete event.

The method of supplementing an incomplete event according to some embodiments of the present disclosure will hereinafter be described in further detail with reference to FIG. 14. FIG. 14 illustrates the supplementation of the service code value of an incomplete event 91.

Referring to FIG. 14, the event processing system 5 may receive the incomplete event 91 and may calculate the similarities (e.g., string similarities) between event information for the incomplete event 91 (e.g., device code value, event type, event grade, etc.) and event information 96 for existing events 92 through 94, as indicated by reference numeral 96. For example, the event processing system 5 may calculate the string similarities between the device code value of the incomplete event 91 and the device code values of the existing events 92 through 94 (if associated code values 95 are device code values).

If the string similarities between the incomplete event 91 and the existing event 92 are equal to or higher than a predefined similarity threshold, the event processing system 5 may supplement the incomplete event 91 with the service code value of the existing event 92. As a result, a complete event 97 may be generated from the incomplete event 91.

Up until now, various examples of the event processing method according to some embodiments of the present disclosure have been described with reference to FIGS. 3 through 14. According to the foregoing, the event processing system 5 may minimize the workload of the administrator by performing various functions such as event merging, event filtering, automatic actions for events, automatic closure for events, and incomplete event supplementation.

A method for automatically determining event grouping using a trained machine learning model according to some embodiments of the present disclosure will hereinafter be described with reference to FIG. 15.

Figure 15:
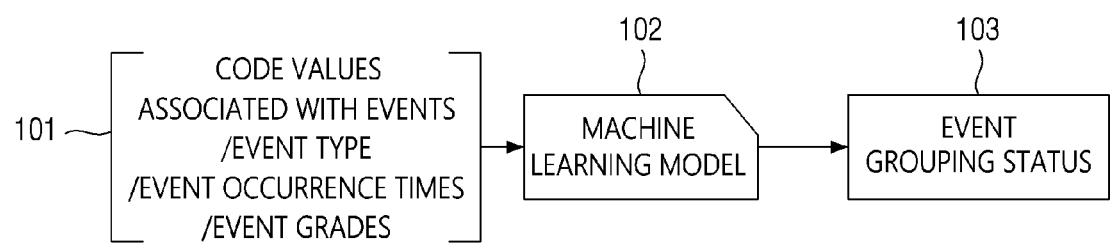
FIG. 15 is a schematic view illustrating a machine learning model for use in determining whether multiple events are grouped according to some other embodiments of the present disclosure.

FIG. 15 is a schematic view illustrating a machine learning model for use in determining whether multiple events are grouped according to some other embodiments of the present disclosure.

The machine learning model of FIG. 15 may be a model introduced to skip the direct referencing of a predefined reference table (e.g., that depicted in FIG. 3) during the grouping of multiple events.

Specifically, referring to FIG. 15, a machine learning model 102 may be trained based on information regarding multiple events for training in advance. For example, the machine learning model 102 may be trained using training datasets consisting of input information 101 and grouping result information (i.e., ground truth labels).

The input information 101 may include, for example, code values associated with the events (e.g., device code values, service scope code values, etc.), event types, event occurrence times, event grades, etc., but the present disclosure is not limited thereto.

The machine learning model 102 may be implemented in various forms. For example, the machine learning model 102 may be established based on a traditional machine learning model such as support vector machines or implemented using a deep learning model (e.g., Convolutional Neural Network (CNN), Recurrent Neural Network (RNN), or Transformer).

Specifically, for example, the machine learning model 102 may be configured to include a plurality of RNN blocks and an output layer (e.g., multi-layer perceptron (MLP)) outputting a value indicating a grouping status. In this case, the RNN blocks may receive information regarding their respective events and analyze the received information in consideration of the order of occurrence of the events. For example, a first RNN block may analyze information (e.g., code values, event type, occurrence time, etc.) regarding a first event, and a second RNN block may analyze information (e.g., code values, event type, occurrence time, etc.) regarding a second event. Then, the output layer may determine whether the events are grouped in consideration of the results of these analyses. In this manner, the grouping status of the events may be accurately determined in consideration of the order of occurrence of the events.

Alternatively, the machine learning model 102 may be implemented using a self-attention-based neural network such as a Transformer. Specifically, the machine learning model 102 may be configured to include multiple self-attention layers and an output layer (e.g., MLP). In this case, the self-attention layers may aggregate information regarding multiple events and analyze the relationships between the events. The output layer may then determine whether the events are grouped based on the results of the analysis. In this manner, the grouping status of the events may be accurately determined in consideration of the relationships between the events.

Once the training of the machine learning model 102 is completed, the event processing system 5 may use the machine learning model 102 to determine a grouping status 103 of the events. As a result, the event processing system 5 may perform event grouping accurately without the need to directly reference a predefined reference table.

So far, the introduction of a machine learning model for event grouping has been described, but a machine learning model may also be employed for purposes such as upgrading event grades and determining whether automatic actions need to be taken for events. For example, the event processing system 5 may establish a machine learning model for upgrading event grades, using training datasets consisting of the input information 101 of FIG. 15, event grade information, and grade adjustment result information (i.e., ground truth labels). Alternatively, the event processing system 5 may establish a machine learning model for determining whether to take automatic actions for events, using training datasets consisting of the input information 101 of FIG. 15, the event grade information, and automatic action result information (i.e., ground truth labels).

A method for simplifying an event processing process by replacing the step of grouping multiple events with a pre-trained machine learning model according to some other embodiments of the present disclosure has been described so far.

The overall processes of the event processing method according to some embodiments of the present disclosure will hereinafter be described.

Figure 16:
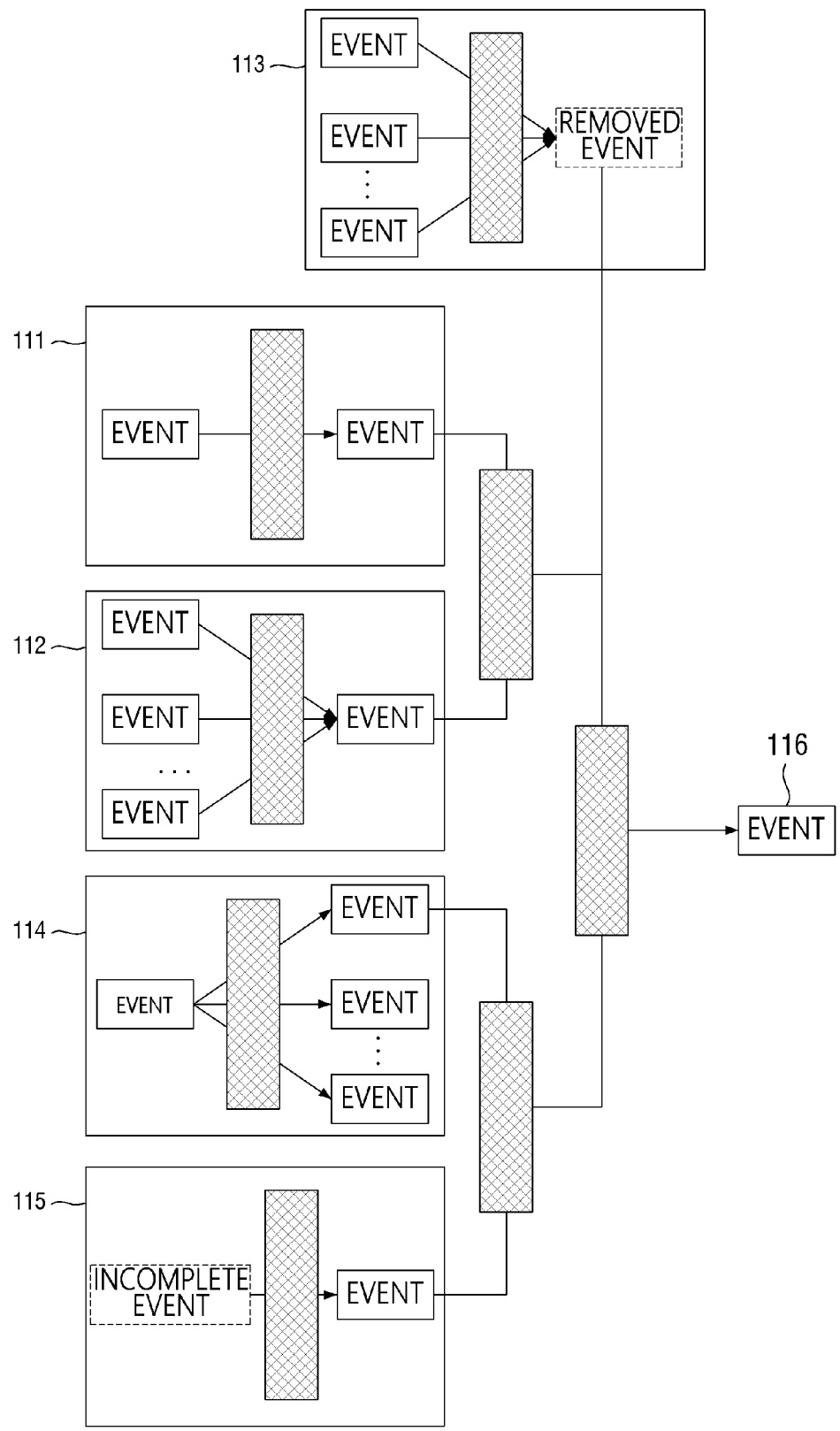
FIG. 16 is a schematic view illustrating the overall processes of the event processing method according to some embodiments of the present disclosure.

FIG. 16 is a schematic view illustrating the overall processes of the event processing method according to some embodiments of the present disclosure.

Referring to FIG. 16, the event processing system 5 may handle received events in a conventional manner, as indicated by reference numeral 111.

Also, the event processing system 5 may regenerate multiple collected events into a single event, as indicated by reference numeral 112.

Also, the event processing system 5 may filter some of collected events using filtering information, as indicated by reference numeral 113.

Also, the event processing system 5 may identify the scope of services associated with an event and subdivide the event by service, thereby generating multiple events, as indicated by reference numeral 114.

Also, the event processing system 5 may supplement an incomplete event using information from existing events, as indicated by reference numeral 115.

Also, the event processing system 5 may perform all the aforementioned operations repeatedly. For example, the event processing system 5 may merge a regenerated event, at least some of multiple events obtained by event subdivision, and a complete event obtained by supplementation back into a single event, as indicated by reference numeral 116.

Thus far, the event processing method according to some embodiments of the present disclosure has been described with reference to FIG. 16. An exemplary computing system 200 that may implement the event processing system 5 will hereinafter be described with reference to FIG. 17.

FIG. 17 is a hardware configuration view of an exemplary computing system 200.

Referring to FIG. 17, the computing device 200 may include at least one processor 201, a bus 203, a communication interface 204, a memory 202, which loads a computer program 206 executed by the processor 201, and a storage 205, which stores the computer program 206. FIG. 17 only illustrates components relevant to the embodiments of the present disclosure, and it is obvious that the computing device 200 may further include other general components other than those illustrated in FIG. 17. In other words, the computing device 200 may be configured to include various components other than those illustrated in FIG. 17 or may be configured without some of the components illustrated in FIG. 17. The components of the computing device 200 will hereinafter be described.

The processor 201 may control the overall operations of the components of the computing device 200. The processor 201 may be configured to include at least one of a central processing unit (CPU), a micro-processor unit (MPU), a micro controller unit (MCU), and a graphic processing unit (GPU), and any other known form of processor in the field to which the present disclosure pertains. The processor 201 may perform computations for at least one application or program for executing operations/methods according to some embodiments of the present disclosure. The computing device 200 may be equipped with one or more processors.

The memory 202 may store various data, commands, and/or information. The memory 202 may load the computer program 206 from the storage 205 to execute the operations/methods according to some embodiments of the present disclosure. The memory 202 may be implemented as a volatile memory such as a random-access memory (RAM), but the present disclosure is not limited thereto.

The bus 203 may provide communication functionality among the components of the computing device 200. The bus 203 may be implemented in various forms, including an address bus, a data bus, and a control bus.

The communication interface 204 may support both wired and wireless Internet communication for the computing device 200. Additionally, the communication interface 204 may also support various other communication methods. For this purpose, the communication interface 204 may be configured to include a communication module that is well known in the field to which the present disclosure pertains.

The storage 205 may temporarily store at least one computer program 206. The storage 205 may be configured to include a non-volatile memory (such as a read-only memory (ROM), an erasable programmable ROM (EPROM), an electrically erasable programmable ROM (EEPROM), or a flash memory), a hard disk, a removable disk, or any other well-known computer-readable medium in the field to which the present disclosure.

The computer program 206 may include one or more instructions that, upon being loaded into the memory 202, direct the processor 201 to perform the operations/methods according to some embodiments of the present disclosure. In other words, by executing the loaded instructions, the processor 201 may perform the operations/methods according to some embodiments of the present disclosure.

For example, the computer program 206 may include one or more instructions to perform the following operations: collecting a plurality of events; grouping at least some of the events based on their associated code values; and regenerating the grouped events into a single event. In this example, the event processing system 5 may be implemented by the computing device 200.

So far, a variety of embodiments of the present disclosure and the effects according to embodiments thereof have been mentioned with reference to FIGS. 1 to 17. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. An event processing method performed by at least one processor, the method comprising:
   collecting a plurality of events;
   grouping at least some of the collected plurality of events based on code values respectively associated with the collected plurality of events, wherein the code values indicate at least one of originating service devices in which the plurality of events have occurred or services provided by the originating service devices;
   regenerating the grouped events into a single event;
   determining whether the regenerated event qualifies for an automatic action;
   acquiring a predefined second rule for the regenerated event, which is a rule that defines the automatic action, based on a determination that the regenerated event qualifies for the automatic action; and
   performing the automatic action with respect to the regenerated event in accordance with the predefined second rule.

2. The event processing method of claim 1, wherein the grouping comprises:
   identifying device groups in which the collected plurality of events have occurred based on the code values; and
   grouping events originating from a same device group based on a result of the identifying.

3. The event processing method of claim 1, wherein the grouped events are events originating from a first device group, and
   the regenerating comprises:
   acquiring a predefined first rule for the first device group, which is a rule that, based on a number of events with a particular grade, among the grouped events, exceeding a threshold value, upgrades the events with the particular grade; and
   regenerating the grouped events into an event with a higher grade than the particular grade based on a determination that the number of events with the particular grade, among the grouped events, exceeds the threshold value.

4. The event processing method of claim 1, wherein the grouping comprises:
   acquiring predefined filtering information, which includes at least one code value associated with each target event to be filtered;
   removing at least one of the collected plurality of events by comparing each of the code values of the collected plurality of events and the at least one code value of the predefined filtering information; and
   grouping at least some of remaining events of the collected plurality of events.

5. The event processing method of claim 1, further comprising:
   receiving an additional event;
   identifying a scope of a service associated with the additional event based on a code value associated with the additional event, wherein the scope of the service indicates a range of a service provided by an originating service device in which the additional event has occurred; and
   generating multiple events from the additional event based on the identified scope of the service.

6. The event processing method of claim 1, further comprising:
   receiving an incomplete event;
   determining similarities between a code value associated with the incomplete event and code values of predefined events; and
   supplementing the incomplete event using event information for events having higher similarities than a similarity threshold.

7. The event processing method of claim 1, further comprising:
   after the performing, determining whether the regenerated event qualifies for an automatic closure; and
   pausing a notification to an administrator and terminating a processing process for the regenerated event based on a determination that the regenerated event qualifies for the automatic closure.

8. The event processing method of claim 1, further comprising:
   collecting an additional event; and
   regrouping the additional event and the regenerated event based on code values respectively associated with the regenerated event and the additional event.

9. The event processing method of claim 1, wherein
   the grouping comprises acquiring a trained machine learning model from data regarding a plurality of events for training, and determining whether the collected plurality of events are grouped, using the trained machine learning model, and
   the data includes code values respectively associated with the plurality of events for training and event type information and grouping status information for each of the plurality of events for training.

10. An event processing system comprising:
    at least one processor; and
    a memory configured to store one or more instructions, wherein the at least one processor is configured to, by executing the one or more instructions stored in the memory, perform:

collecting a plurality of events;

grouping at least some of the collected plurality of events based on code values respectively associated with the collected plurality of events, wherein the code values indicate at least one of originating service devices in which the events have occurred or services provided by the originating service devices;

regenerating the grouped events into a single event;

determining whether the regenerated event qualifies for an automatic action;

acquiring a predefined second rule for the regenerated event, which is a rule that defines the automatic action, based on a determination that the regenerated event qualifies for the automatic action; and performing the automatic action with respect to the regenerated event in accordance with the predefined second rule.

11. The event processing system of claim 10, wherein the grouping comprises
identifying device groups in which the collected plurality of events have occurred based on the code values; and
grouping events originating from a same device group based on a result of the identifying.

12. The event processing system of claim 11, wherein
the grouped events are events originating from a first device group, and
the regenerating comprises:
acquiring a predefined first rule for the first device group, which is a rule that, based on a number of events with a particular grade, among the grouped events, exceeding a threshold value, upgrades the events with the particular grade; and
regenerating the grouped events into an event with a higher grade than the particular grade based on a determination that the number of events with the particular grade, among the grouped events, exceeds the threshold value.

13. The event processing system of claim 11, wherein the grouping comprises:
acquiring predefined filtering information, which includes at least one code value associated with each target event to be filtered;
removing at least one of the collected plurality of events by comparing each of the code values of the collected plurality of events and the at least one code value of the predefined filtering information; and
grouping at least some of remaining events of the collected plurality of events.

14. The event processing system of claim 11, wherein the at least one processor is further configured to perform:
receiving an additional event;
identifying a scope of a service associated with the additional event based on code values associated with the additional event, wherein the scope of the service indicates a range of a service provided by an originating service device in which the additional event has occurred; and
generating multiple events from the additional event based on the identified scope of the service.

15. The event processing system of claim 11, wherein the at least one processor is further configured to perform:
receiving an incomplete event;
determining similarities between a code value associated with the incomplete event and code values of predefined events; and
supplementing the incomplete event using event information for events having higher similarities than a similarity threshold.

16. The event processing system of claim 11, wherein the at least one processor is further configured to perform:
determining whether the regenerated event qualifies for an automatic action;
acquiring a predefined second rule for the regenerated event, which is a rule that defines the automatic action, based on a determination that the regenerated event qualifies for the automatic action; and
performing the automatic action on the regenerated event in accordance with the predefined second rule.

17. The event processing system of claim 11, wherein the at least one processor is further configured to perform:
collecting an additional event; and
regrouping the additional event and the regenerated event based on code values respectively associated with of the additional event and the regenerated event.

18. The event processing system of claim 11, wherein
the grouping comprises acquiring a trained machine learning model from data regarding a plurality of events for training, and determining whether the collected plurality of events are grouped, using the trained machine learning model, and
the data includes code values respectively associated with the plurality of events for training and event type information and grouping status information for each of the plurality of events for training.

19. A non-transitory computer-readable recording medium storing computer program executable by at least one processor to perform:
collecting a plurality of events;
grouping at least some of the collected plurality of events based on code values respectively associated with the collected plurality of events, wherein the code values indicate at least one of originating service devices in which the events have occurred or services provided by the originating service devices;
regenerating the grouped events into a single event;
determining whether the regenerated event qualifies for an automatic action;
acquiring a predefined second rule for the regenerated event, which is a rule that defines the automatic action, based on a determination that the regenerated event qualifies for the automatic action; and
performing the automatic action with respect to the regenerated event in accordance with the predefined second rule.

* * * * *